(12) United States Patent
Hickel et al.

(10) Patent No.: US 11,618,368 B2
(45) Date of Patent: Apr. 4, 2023

(54) VOID-FILLING APPARATUS FOR CARGO

(71) Applicant: Sunrise MFG, Inc., Rancho Cordova, CA (US)

(72) Inventors: Thomas R. Hickel, Sacramento, CA (US); Lori H. Funk, Mooresville, NC (US)

(73) Assignee: SUNRISE MFG, INC., Rancho Cordova, CA (US)

( * ) Notice: Subject to any disclaimer, the term of this patent is extended or adjusted under 35 U.S.C. 154(b) by 296 days.

(21) Appl. No.: 17/139,862

(22) Filed: Dec. 31, 2020

(65) Prior Publication Data
US 2021/0245651 A1   Aug. 12, 2021

Related U.S. Application Data

(60) Provisional application No. 62/971,822, filed on Feb. 7, 2020.

(51) Int. Cl.
*B60P 7/13* (2006.01)
*B60P 7/135* (2006.01)

(52) U.S. Cl.
CPC ................... *B60P 7/135* (2013.01)

(58) Field of Classification Search
CPC .......... B60P 7/135; B65D 19/38; B61D 45/00
USPC .................... 410/151, 121; 428/12, 116, 118
See application file for complete search history.

(56) References Cited

U.S. PATENT DOCUMENTS

| | | | | |
|---|---|---|---|---|
| 3,823,675 A | * | 7/1974 | Farley ................. | B61D 45/006 206/583 |
| 4,349,303 A | * | 9/1982 | Liebel ................. | B61D 45/006 410/154 |
| 4,865,889 A | * | 9/1989 | Boyse ................... | B65D 65/44 428/116 |
| 7,254,932 B2 | * | 8/2007 | Tanaka ................... | B65B 55/20 53/139.5 |

(Continued)

OTHER PUBLICATIONS

Brent Lichty, "Conceptual Idea fortesting and development of the UPRR & Sunrise Manufacturing Open Top Lumber Pak"; Sunrise Freight Protection, 18 pages, Sep. 2017.

(Continued)

*Primary Examiner* — D Glenn Dayoan
*Assistant Examiner* — Sunsurraye Westbrook
(74) *Attorney, Agent, or Firm* — BakerHostetler

(57) ABSTRACT

A void-filling apparatus is disclosed. The void-filling apparatus may include multiple end pieces secured together by multiple cylindrical elements. The end pieces may include a sheet (or sheets) of material secured to a panel, which may include a honeycomb panel. Each of the cylindrical elements may fit into a respective opening in the first and second end pieces. In some instances, the end pieces and the cylindrical elements are made of paper-based materials. However, the end pieces and the cylindrical elements are made of a paper-based material may be covered by a liquid-resistant material, resulting in a liquid-resistant void-filling apparatus. In order to maintain engagement between the cylindrical elements and the end pieces, the openings (into which the cylindrical elements are inserted) may include a diameter to promote a compression fit. Adhesive securing may also be used. Also, adjacent cylindrical elements may be equidistant from each other.

20 Claims, 12 Drawing Sheets

(56) References Cited

U.S. PATENT DOCUMENTS 8,132,771 B2 * 3/2012 Lee ........................ B61D 45/00
211/49.1

OTHER PUBLICATIONS

AAR Open Top Loading Rules Manual, "LLP Test Loads #1 and #2 review", 16 pages, Jan. 2019.

* cited by examiner

VOID-FILLING APPARATUS FOR CARGO

CROSS-REFERENCE TO RELATED APPLICATIONS

The present application claims the benefit of U.S. Provisional Application No. 62/971,822, entitled "VOID-FILLING APPARATUS FOR CARGO," filed Feb. 7, 2020, the content of which is incorporated herein by reference in its entirety for all purposes.

FIELD

The following description relates to an apparatus that fills a void between cargo. In particular, the following description relates to an apparatus that includes two end pieces and several tubes connected to the two end pieces. The apparatus is generally lightweight and easy to assemble by a user.

BACKGROUND

An apparatus can be used to assist in shipment of the cargo. Several current designs may include pre-assembled parts. However, when the apparatus manufacturer ships the apparatus in a pre-assembled manner, the pre-assembly can contribute to additional shipping volume. Further, if the apparatus is not pre-assembled, the current designs may provide insufficient means for keeping the parts together once assembled.

SUMMARY

In one aspect, a void-filling apparatus suitable for use with transporting cargo is described. The void-filling apparatus may include a first end piece that includes a first opening. The first end piece may be covered by a first liquid-resistant material. The void-filling apparatus may further include a second end piece that includes a second opening. The second end piece may be covered by a second liquid-resistant material. The void-filling apparatus may further include a cylindrical element positioned in the first opening and the second opening. The cylindrical element may be covered by a third liquid-resistant material.

In another aspect, a void-filling apparatus suitable for use with transporting cargo is described. The void-filling apparatus may include a first end piece covered by a first liquid-resistant material. The void-filling apparatus may further include a second end piece covered by a second liquid-resistant material. The void-filling apparatus may further include a first cylindrical element coupled to the first end piece and the second end piece. The void-filling apparatus may further include a second cylindrical element coupled to the first end piece and the second end piece. The void-filling apparatus may further include a third cylindrical element coupled to the first end piece and the second end piece. In some instances, the first cylindrical element, the second cylindrical element, and the third cylindrical element are each covered by a third liquid-resistant material. Also, in some instances, the second cylindrical element and the third cylindrical element are equidistant from the first cylindrical element.

In another aspect, a method for forming a void-filling apparatus suitable for use with cargo is described. The method may include laminating a first corrugated sheet to a first honeycomb panel. The first corrugated sheet and the first honeycomb panel may define a first end piece. The method may further include laminating a second corrugated sheet to a second honeycomb panel. The second corrugated sheet and the second honeycomb panel may define a second end piece. The method may further include forming a first opening in the first end piece. The method may further include forming a second opening in the second end piece. The method may further include covering the first end piece with a first liquid-resistant material. The method may further include covering the first end piece with a second liquid-resistant material. The method may further include providing a cylindrical element configured to engage the first end piece and the second end piece at the first opening and the second opening, respectively. The method may further include covering the cylindrical element with a third liquid-resistant material.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
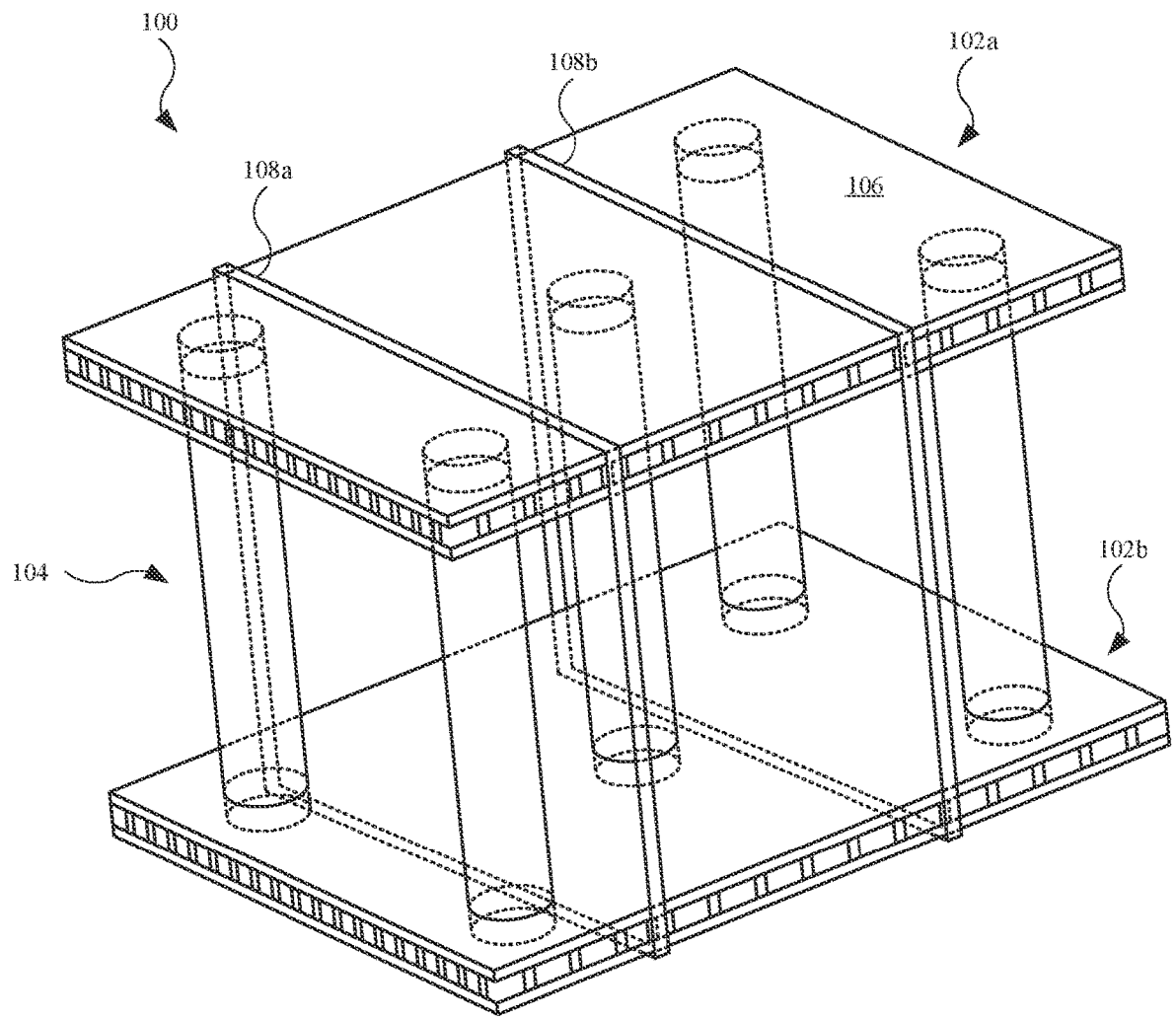
FIG. 1 illustrates an isometric view of an embodiment of a void-filling apparatus.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to void-filling apparatuses used to protect cargo during shipment. A void-filling apparatus described herein may include lightweight materials designed for easy transport to end users, with the lightweight design also providing ease for integrated with cargo prior to shipment. However, the materials may be relatively sturdy and robust so that the void-filling apparatus can limit or prevent movement of cargo, which may include lumber, as a non-limiting example. In this regard, the material may include paper-based materials. Also, a void-filling apparatus may be used in outdoor applications, such as on open car trains in which the train car has little or no ceiling. In this regard, the materials of the void-filling apparatus may be covered by liquid-resistant materials, such as shrink wrap or a polymer-based encasement. These materials may include plastics or a polyethylene sheet, as non-limiting examples.

A void-filling apparatus described herein may include a pair of end pieces. The end pieces may include a corrugated sheet of material laminated together with a honeycomb panel. In some instances, the sheet includes a material rated by an edge crush test ("ECT") to ensure a minimum durability. However, other materials, such as a composite of wood and plastic (as a non-limiting example) are possible. The void-filling apparatus may also include several cylindrical elements, or tubes. In order to secure the cylindrical elements with the end pieces, the end pieces may include several holes, or openings, with each hole designed to receive an end of a cylindrical element. Moreover, in some instances, the diameter of the hole may be slightly smaller than that of the cylindrical element to provide a compression fit between the cylindrical element and the end piece. Other methods may be implemented to provide an added securement between the cylindrical elements and the end pieces. For instance, each cylindrical element may include an end cap on each end (of the cylindrical element). The end caps provide additional surface area for an adhesive such that the cylindrical elements can be adhesively secured, in addition to the compression fit, with the end pieces.

Also, in several embodiments, the void-filling apparatus includes end pieces that are aligned with each other. In particular, the respective edges of each end piece are aligned with each other. However, in some embodiments, the void-filling apparatus includes end pieces that are not aligned with each other. In these embodiments, the end pieces are offset with respect to each other. In this manner, the void-filling apparatus can accommodate one or more obstructions (such as a rail or other object on a transport mechanism), while also maintaining proper function, i.e., to limit or prevent movement of the cargo.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an isometric view of an embodiment of a void-filling apparatus 100. The void-filling apparatus 100 may be referred to as a void filler or a space filler, as non-limiting examples. In some embodiments, the void-filling apparatus 100 may be used to fill spaces or voids between cargo (not shown in FIG. 1), particularly when the cargo is loaded on a transport mechanism (train car or semi-trailer, as non-limiting examples). Due in part to acceleration and deceleration of the transport mechanism during transport, the cargo tends to move or shift. However, the void-filling apparatus 100 is designed to limit or prevent movement of the cargo. As a result of the reduced or averted movement of the cargo, the void-filling apparatus 100 can prevent damage to the cargo and/or prevent the cargo from falling off of the transport mechanism.

The void-filling apparatus 100 may include an end piece 102a and an end piece 102b. The end piece 102a and the end piece 102b may be referred to as a first end piece and a second end piece, respectively. However, "first" and "second" may be interchanged in some instances. The void-filling apparatus 100 may further include cylindrical elements 104, or tubes, connected to the end piece 102a and the end piece 102b. The end piece 102a and the end piece 102b may provide an engagement surface for the void-filling apparatus 100 to engage the cargo. For instance, an engagement surface 106 of the end piece 102a is shown. Although not shown, the end piece 102b may include an engagement surface similar to the engagement surface 106. The cylindrical elements 104 are designed to resist/offset/counter to forces provided to the void-filling apparatus 100 by the cargo. Although not shown, in some embodiments, the cylindrical elements 104 are replaced by other elongated elements with a cross section that includes different polygonal shapes, such as a triangular or rectangular shape, as non-limiting examples. Other elongated elements having five or more sides are also possible. Also, in order to maintain the end piece 102a and the end piece 102b with the cylindrical elements 104, the void-filling apparatus 100 may also include a strap 108a and a strap 108b, which may also be referred to as a first strap and a second strap, respectively. The strap 108a and the strap 108b may each include a polymer material or band, or some other suitable material. Also, although two straps are shown, the number of straps may vary. For instance, in some embodiments, the void-filling apparatus 100 includes a single strap. Also, in some embodiments, the void-filling apparatus 100 includes three or more straps.

Figure 2:
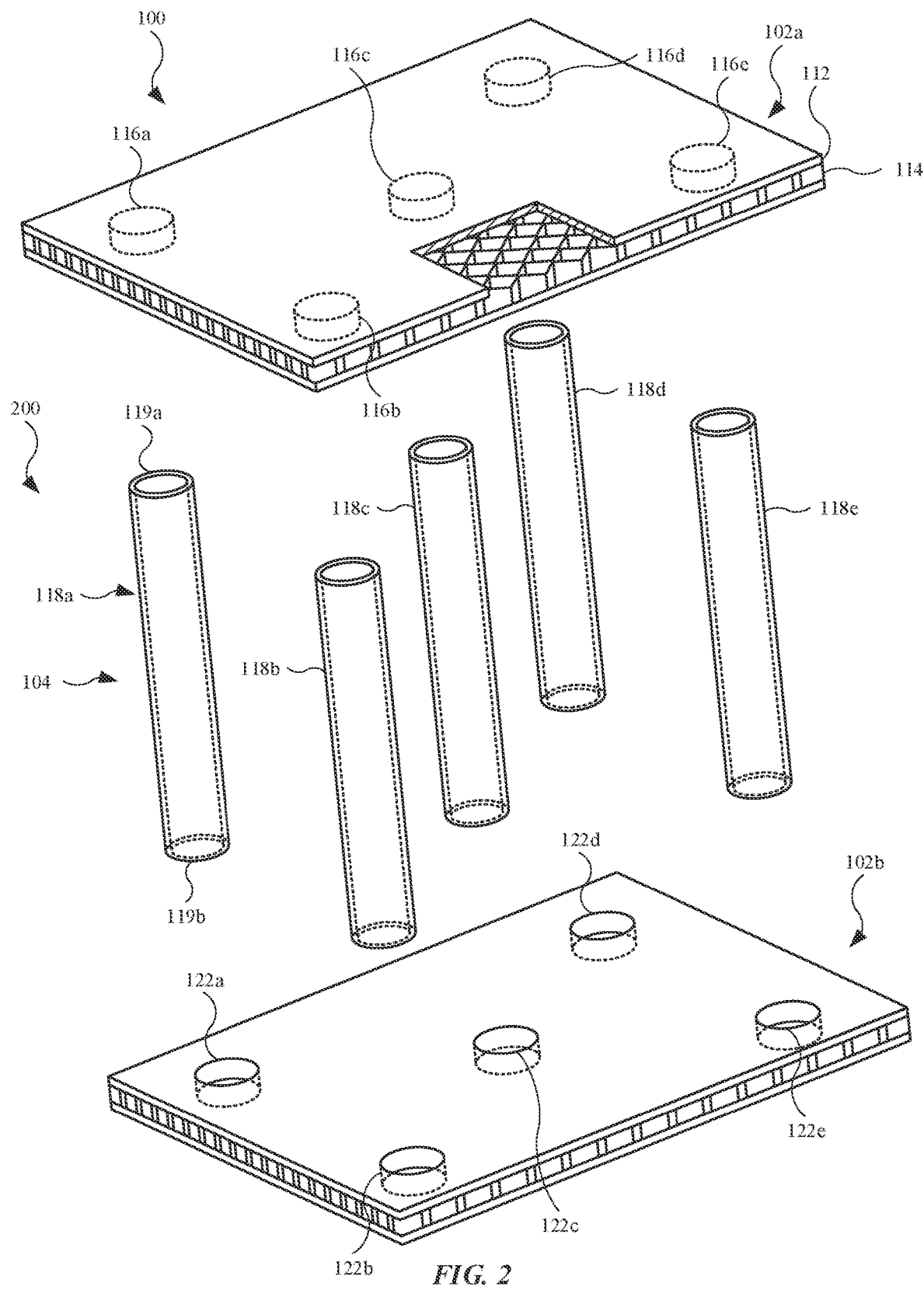
FIG. 2 illustrates an exploded view of the void-filling apparatus shown in FIG. 1, showing various components and features of the void-filling apparatus.

FIG. 2 illustrates an exploded view of the void-filling apparatus shown in FIG. 1, showing various components and features of the void-filling apparatus 100. For purposes of simplicity, the strap 108a and the strap 108b (shown in FIG. 1) is not shown. The end piece 102a may include one or more materials. For example, as shown, the end piece 102a includes a sheet 112 secured with a panel 114. In some embodiments, the sheet 112 includes a paper-based corrugated sheet. In some embodiments, the sheet 112 includes a material (or materials) rated by an edge crush test ("ECT"). In this regard, the sheet 112 may include a 51 ECT material (or materials). However, other materials, such as a composite of wood and plastic (as a non-limiting example) are possible. The panel 114, shown as a partial cross section of the end piece 102a, may include a honeycomb panel. However, other types of materials used to form the panel 114 are possible.

In order to receive the cylindrical elements 104, the end piece 102a may include several openings. As shown, the end piece 102a includes an opening 116a, an opening 116b, an opening 116c, an opening 116d, and an opening 116e. The opening 116a, the opening 116b, the opening 116c, the opening 116d, and the opening 116e may be referred to as a first opening, a second opening, a third opening, a fourth opening, and a fifth opening, respectively. However, "first," "second," "third," "fourth," and "fifth" may be interchanged in some instances. Several methods may be used to form the aforementioned openings. For instance, a die cutting operation may be used to die cut partially through the end piece 102a to form a blind hole. In particular, the die cutting operation may be applied to the panel 114, while the sheet 112 is generally undisturbed by the die cutting operation. In this regard, the sheet 112 may serve as a protective backing to the panel 114. Also, subsequent to the die cutting operation, the end piece 102a may be covered by a water-resistant material by a shrink wrapping operation, as a non-limiting example. This will be further shown and discussed below. The end piece 102b may include any materials and features shown and described for the end piece 102a.

The cylindrical elements 104 include a cylindrical element 118a, a cylindrical element 118b, a cylindrical element 118c, a cylindrical element 118d, and a cylindrical element 118e. The cylindrical element 118a, the cylindrical element 118b, the cylindrical element 118c, the cylindrical element 118d, and the cylindrical element 118e may be referred to as a first cylindrical element, a second cylindrical element, a third cylindrical element, a fourth cylindrical element, and a fifth cylindrical element, respectively. However, "first," "second," "third," "fourth," and "fifth" may be interchanged in some instances. In some embodiments, the aforementioned cylindrical elements include a paper-based material. Each of the aforementioned cylindrical elements may be rated, with the rating providing an amount load that a cylindrical element can absorb without becoming damaged. For example, the cylindrical elements (and other cylindrical elements described herein) may include a rating of 90 klbs/foot-ton, as a non-limiting example. Further, in some cases, the aforementioned cylindrical elements undergo a wrapping operation in which a polymer-based material, or some other material(s), is wrapped around the outer perimeter of each cylindrical element to form a polymer wrap. Generally, any flexible water-resistant material may be used. As a result, each of the cylindrical elements may form water-resistant cylindrical elements.

During assembly, one end of the cylindrical element 118a, the cylindrical element 118b, the cylindrical element 118c, the cylindrical element 118d, and the cylindrical element 118e is positioned in the opening 116a, the opening 116b, the opening 116c, the opening 116d, and the opening 116e, respectively. As example, the cylindrical element 118a includes an end 119a that can be inserted into the opening 116a.

Similarly, the end piece 102b includes an opening 122a, an opening 122b, an opening 122c, an opening 122d, and an opening 122e. The opening 122a, the opening 122b, the opening 122c, the opening 122d, and the opening 122e may be referred to as a first opening, a second opening, a third opening, a fourth opening, and a fifth opening, respectively. However, "first," "second," "third," "fourth," and "fifth" may be interchanged in some instances. During assembly, the remaining end of the cylindrical element 118a, the cylindrical element 118b, the cylindrical element 118c, the cylindrical element 118d, and the cylindrical element 118e is positioned in the opening 122a, the opening 122b, the opening 122c, the opening 122d, and the opening 122e, respectively. As example, the cylindrical element 118a includes an end 119b that can be inserted into the opening 122a. It can be seen that the number of openings in each of the end piece 102a and the end piece 102b matches the number of cylindrical elements 104. Accordingly, as the number of cylindrical elements vary in other embodiments, the number of opening in the end pieces can also change to match the number of cylindrical elements.

Also, each of the components shown and described for the void-filling apparatus 100 can be shipped as a kit from the manufacturer (of the void-filling apparatus 100) to an end user. Based on the size and shape of the openings generally corresponding to the size and shape of the cylindrical elements, the void-filling apparatus 100 provides a relatively simple assembly process for the end user.

Figure 3:
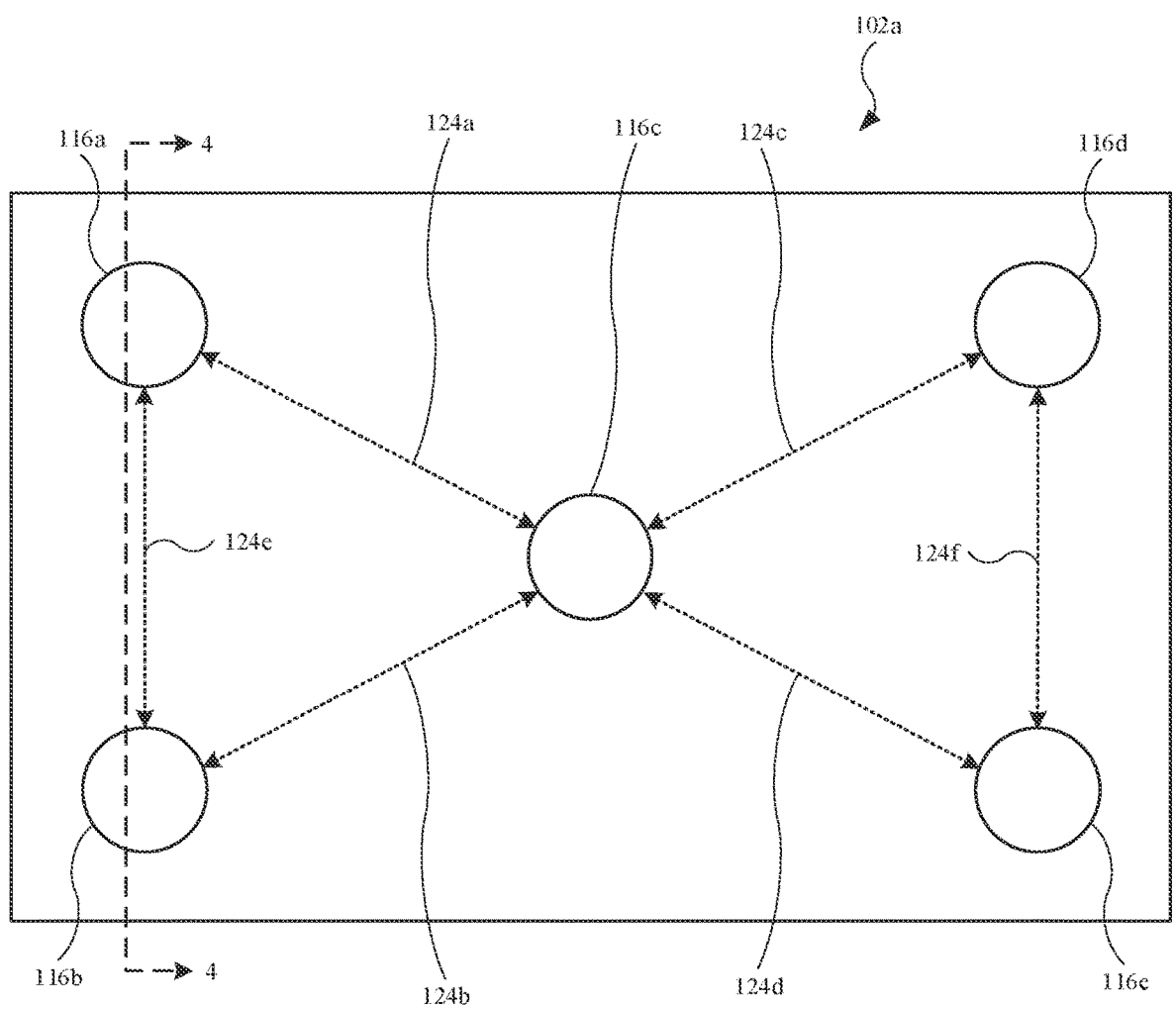
FIG. 3 illustrates a plan view of the end piece.

FIG. 3 illustrates a plan view of the end piece 102a. As shown, the opening 116a is separated from the opening 116c by a distance 124a. Also, the opening 116b is separated from the opening 116c by a distance 124b. Also, the opening 116d is separated from the opening 116c by a distance 124c. Lastly, the opening 116e is separated from the opening 116c by a distance 124d. In some embodiments, the distance 124a, the distance 124b, the distance 124c, and the distance 124d are identical, or equal in length. In these embodiments, the opening 116a, the opening 116b, the opening 116d, and the opening 116e are equidistant from the opening 116c. Accordingly, when the cylindrical elements 104 (shown in FIG. 2) are inserted into the openings, the cylindrical element 118a, the cylindrical element 118b, the cylindrical element 118d, and the cylindrical element 118e are equidistant from the cylindrical element 118c. In this regard, the cylindrical element 118c acts as a "reference cylindrical element," and several cylindrical elements are equally spaced apart from the cylindrical element 118c. By providing equidistant spacing among the cylindrical elements 104, the void-filling apparatus 100 (shown in FIGS. 1 and 2) can more readily a load (to the void-filling apparatus 100) evenly throughout the void-filling apparatus 100.

Additionally, the opening 116a is separated from the opening 116b by a distance 124e, and the opening 116d is separated from the opening 116e by a distance 124f. In some embodiments, the distance 124a, the distance 124b, the distance 124c, and the distance 124d are identical, or equal in length. In these embodiments, the opening 116a, the opening 116b, and the opening 116c equidistant from each other, and the opening 116d, the opening 116e, and the opening 116c equidistant from each other. While equidistant spacing is shown and described, the openings (and accordingly the cylindrical elements) need not be equally spaced apart. For instance, some openings (and accordingly some cylindrical elements) may be spaced closer together than other openings to provide added protection in certain locations. Accordingly, in some instances, the cylindrical elements may not be equidistant, or equally spaced apart from a "reference" cylindrical elements.

Further, some consideration should be taken to ensure the opening 116a, the opening 116b, the opening 116d, and the opening 116e opening are sufficiently far enough away from their respective corners and edges of the end piece 102a. This may ensure the aforementioned openings do not damage the end piece 102a at or near the corners during the die cutting operation, and/or may ensure the cylindrical elements (when placed in the openings) do not provide a sufficient enough force to the corners so as to damage the end piece 102a at the corners. For instance, each of the opening 116a, the opening 116b, the opening 116d, and the opening 116e may be positioned at a distance approximately in the range of 6 to 12 inches from the nearest edge of the end piece 102a. In some embodiments, each of the opening 116b, the opening 116d, and the opening 116e is positioned 9 inches from the nearest edge of the end piece 102a. Also, in some instances, the opening 116c is located at a center point of the end piece 102a. The end piece 102b (shown in FIG. 2) may features shown and described in FIG. 3 for the end piece 102a.

Figure 4:
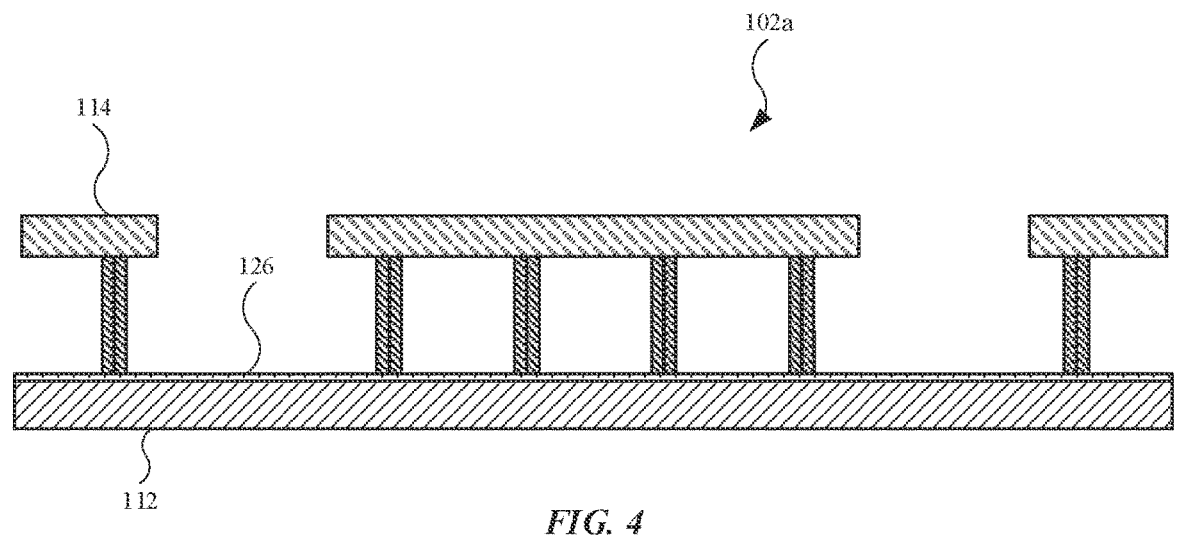
FIG. 4 illustrates a cross-sectional view of the end piece shown in FIG. 3, showing various features of the end piece.
Figure 5:
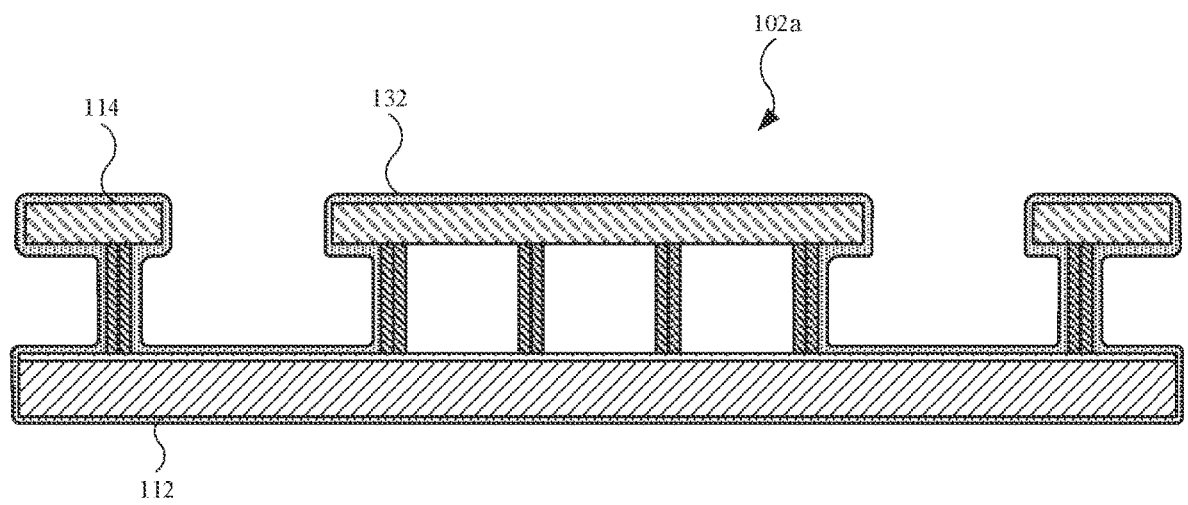
FIG. 5 illustrates a cross-sectional view of the end piece shown in FIG. 4, showing a liquid-resistant material covering the sheet and the panel.

FIG. 4 illustrates a cross-sectional view of the end piece 102a shown in FIG. 3, showing various features of the end piece 102a. As shown, the sheet 112 is secured with the panel 114. This process may be performed by a lamination process. As an example, the sheet 112 can be secured with the panel 114 by an adhesive 126. One or more additional layers may be provided to the end piece 102a. For example, FIG. 5 illustrates a cross-sectional view of the end piece 102a shown in FIG. 4, showing a liquid-resistant material 132 covering the sheet 112 and the panel 114. As an example, the liquid-resistant material 132 may be applied by a shrink wrapping operation. In this regard, the liquid-resistant material 132 may include a film that that is exposed to a heat sources that causes the film to shrink and conform to the object(s) covered by the film. The end piece 102b (shown in FIG. 2) may features shown and described in FIGS. 4 and 5 for the end piece 102a.

Figure 6:
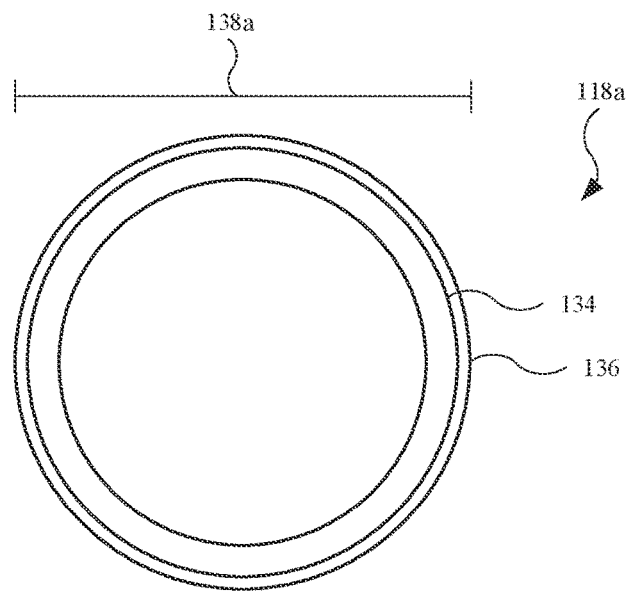
FIG. 6 illustrates a plan view of a cylindrical element, in accordance with some described embodiments.

FIG. 6 illustrates a plan view of a cylindrical element, in accordance with some described embodiments. As an example, the cylindrical element 118a is shown, and is representative of other cylindrical elements shown and described herein. Accordingly, the cylindrical elements described herein may include may features and materials shown and described for the cylindrical element 118a in FIG. 6. The cylindrical element 118a includes an outer perimeter 134 defined by the cylindrical nature of the cylindrical element 118a. The cylindrical element 118a may include a water-resistant material 136 that covers the outer perimeter 134. The water-resistant material 136 may cover the outer perimeter 134 of the cylindrical element 118a in its entirety. The water-resistant material 136 may include a polymer-based wrap, such as polyethylene, as a non-limiting example. Also, the cylindrical element 118a includes a dimension 138a that defines a diameter, which in some cases includes the material thickness of the water-resistant material 136.

Figure 7:
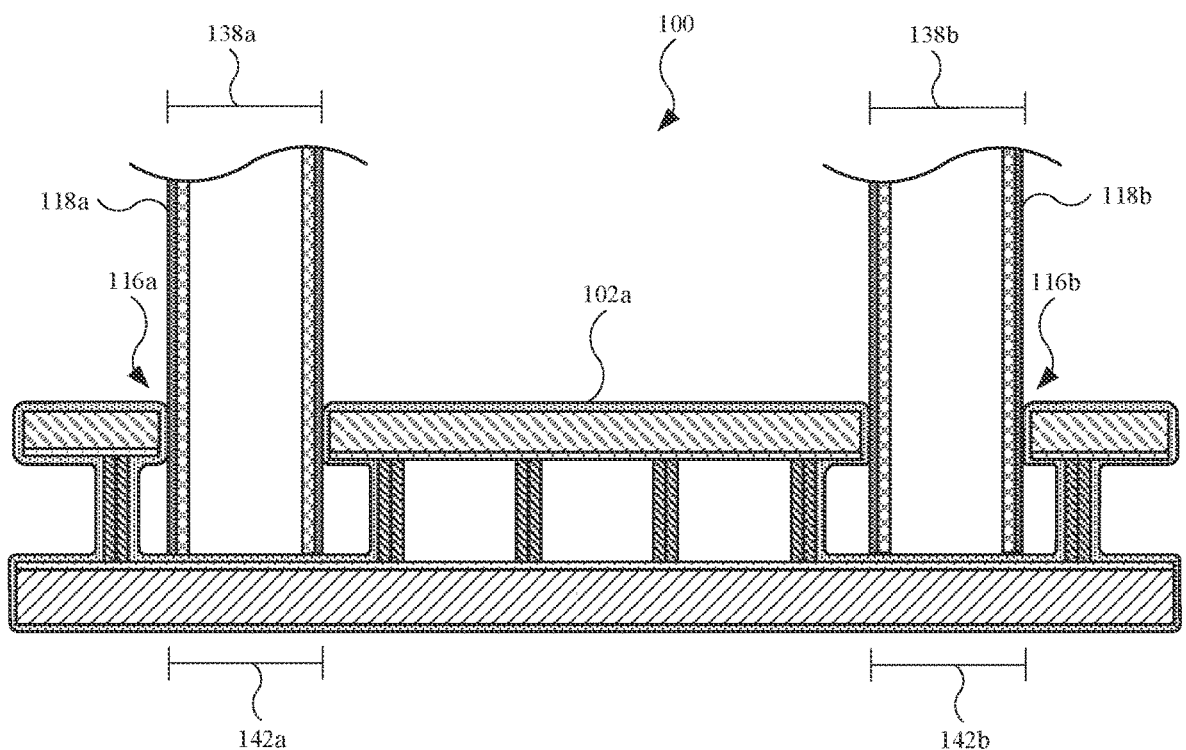
FIG. 7 illustrates a cross-sectional view of the void-filling apparatus, showing several cylindrical elements secured with the end piece.

FIG. 7 illustrates a cross-sectional view of the void-filling apparatus 100, showing several cylindrical elements secured with the end piece 102a. As shown, the cylindrical element 118a and the cylindrical element 118b are positioned in the opening 116a and the opening 116b, respectively. Also, the cylindrical element 118b includes a dimension 138b that defines a diameter of the cylindrical element 118b. The dimension 138b may be the same as, or at least substantially similar to, the dimension 138a.

The opening 116a and the opening 116b include a dimension 142a and a dimension 142b, respectively. The dimension 142a and the dimension 142b can define a diameter of the opening 116a and the opening 116b, respectively. The dimension 142b may be the same as, or at least substantially similar to, the dimension 142a. In some embodiments, the dimension 142a and the dimension 142b are no greater than the dimension 138a and the dimension 138b, respectively. Further, in some embodiments, the dimension 142a and the dimension 142b are smaller (but not substantially smaller) than the dimension 138a and the dimension 138b, respectively, such that the cylindrical element 118a and the cylindrical element 118b engage, and remain in, the opening 116a and the opening 116b, respectively, by a compression fit. While not shown, the remaining cylindrical elements (shown in FIG. 2) may also engage openings in the end piece 102a and the end piece 102b in a manner similar to what is shown and described in FIG. 7. Accordingly, the remaining openings may include features shown and described for the opening 116a and the opening 116b shown in FIG. 7.

Figure 8:
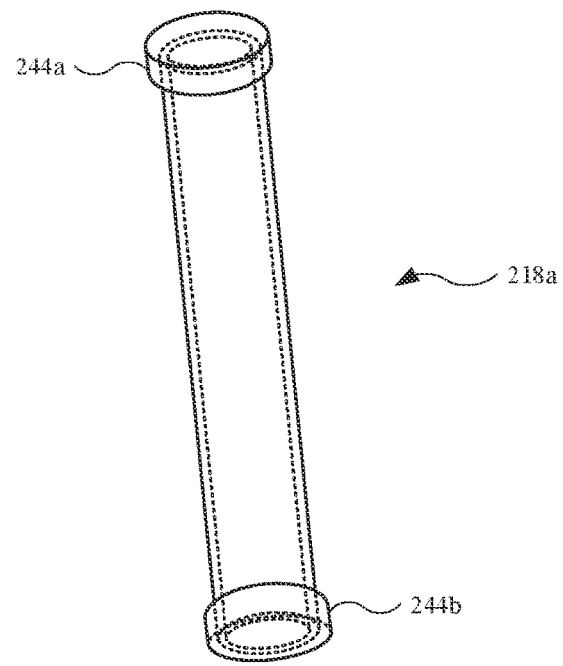
FIG. 8 illustrates an alternate embodiment of a cylindrical element, showing several end caps on the cylindrical element.

FIG. 8 illustrates an alternate embodiment of a cylindrical element 218a, showing several end caps on the cylindrical element 218a. The cylindrical element 218a may include any features and materials described herein for a cylindrical element. As shown, the cylindrical element 218a includes an end cap 244a on one end of the cylindrical element 218a and an end cap 244b on another opposing end of the cylindrical element 218a. The end cap 244a and the end cap 244b can provide additional surface area to the cylindrical element 218a.

Figure 9:
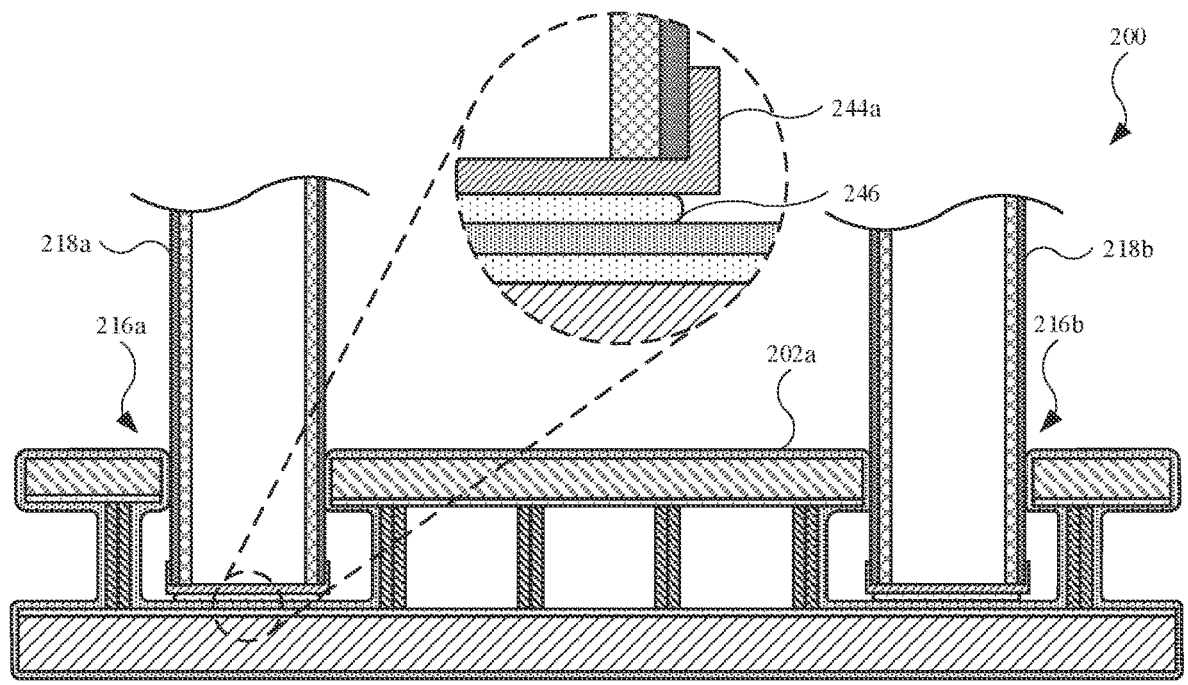
FIG. 9 illustrates a cross-sectional view of an embodiment of a void-filling apparatus, showing several cylindrical elements secured with an end piece, with each cylindrical element having an end cap.

FIG. 9 illustrates a cross-sectional view of an embodiment of a void-filling apparatus 200, showing several cylindrical elements secured with an end piece 202a, with each cylindrical element having an end cap. The void-filling apparatus 200 may include any features and materials described herein for a void-filling apparatus. As shown, the cylindrical element 218a and a cylindrical element 218b are positioned in an opening 216a and an opening 216b, respectively, of the end piece 202a. As shown in the enlarged view, the end cap 244a is secured with the end piece 202a by an adhesive 246. Accordingly, the adhesive 246 provides a mechanical connection between the end cap 244a and the end piece 202a, which may be in addition to a compression fit between the end cap 244a and the end piece 202a. As a result, the securement between cylindrical element 218a and the end piece 202a is enhanced/increased. Although not labeled, it should be noted that the cylindrical element 218b may include an end cap that is secured with the end piece 202a by an adhesive. Also, although not shown, an additional end piece may secure (including adhesively secure) with the cylindrical element 218a and the cylindrical element 218b, and may include any features described herein for the end piece 202a. The features shown and described in FIGS. 8 and 9 may be used to modify the void-filling apparatus 100 shown in FIG. 1.

Figure 10:
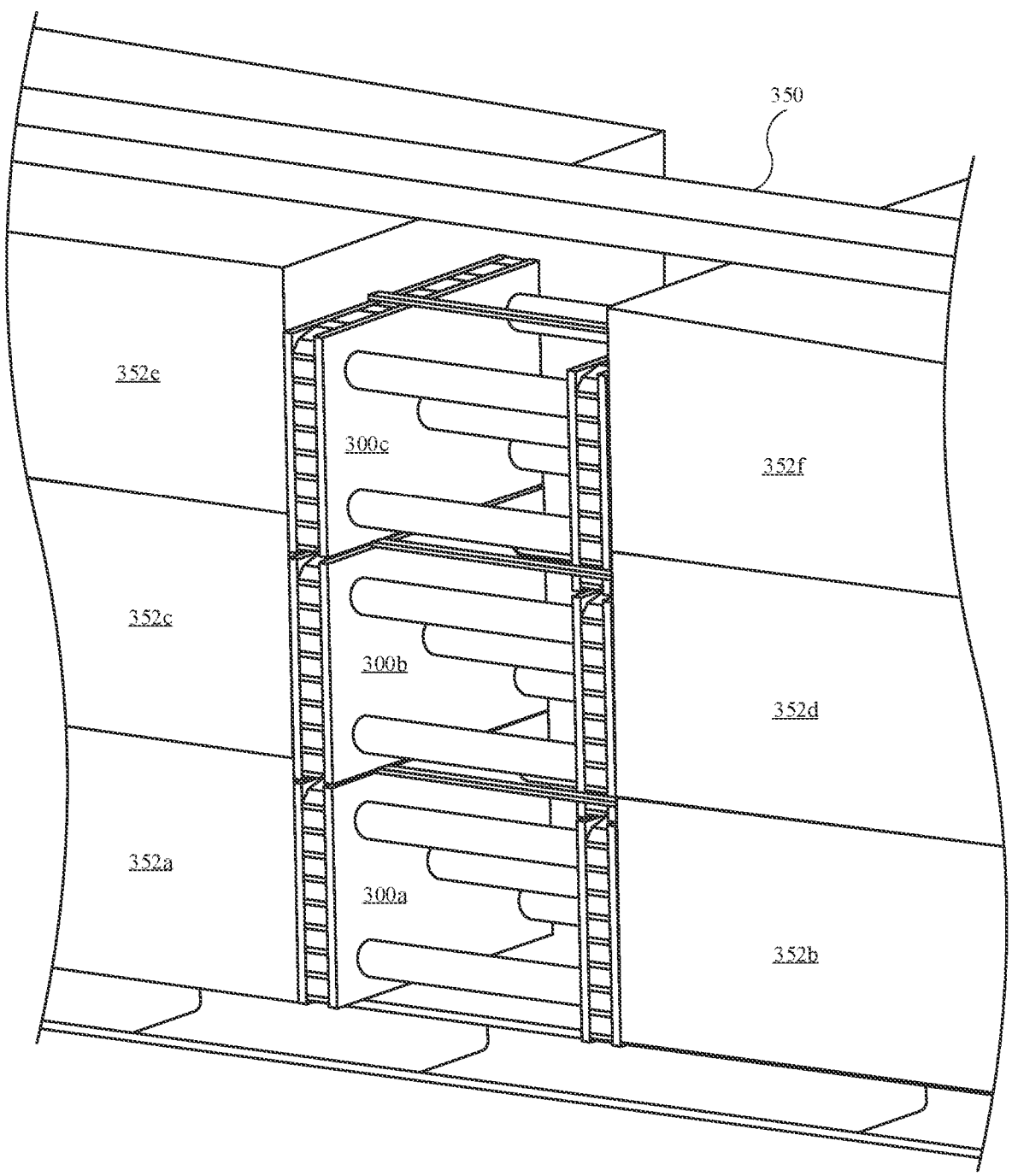
FIG. 10 illustrates an isometric view of several void-filling apparatuses positioned between cargo, with the void-filling apparatuses and the cargo positioned on a transport mechanism, in accordance with some described embodiments.

FIG. 10 illustrates an isometric view of several void-filling apparatuses positioned between cargo, with the void-filling apparatuses and the cargo positioned on a transport mechanism 350, in accordance with some described embodiments. The void-filling apparatuses shown and described in FIG. 10 may include any features and materials described herein for a void-filling apparatus. As shown, a void-filling apparatus 300a is positioned between cargo 352a and cargo 352b, a void-filling apparatus 300b is positioned between cargo 352c and cargo 352d, and a void-filling apparatus 300c is positioned between cargo 352e and cargo 352f. Each of the aforementioned cargo may include lumber, as a non-limiting example. Also, the transport mechanism 350 may include a train car. However, in some embodiments, the transport mechanism 350 includes a semi-truck, as a non-limiting example.

Based on the position of the void-filling apparatus 300a, the void-filling apparatus 300b, and the void-filling apparatus 300c, the respective cargo surrounding the void-filling apparatus 300a, the void-filling apparatus 300b, and the void-filling apparatus 300c is limited or prevented from movement, particularly during instances of acceleration and deceleration of the transport mechanism 350 that would otherwise cause the cargo to move or shift. Also, the void-filling apparatus 300a, the void-filling apparatus 300b, and the void-filling apparatus 300c may include parts and components, each of which are covered/coated by a water-resistant material. Beneficially, when the void-filling apparatus 300a, the void-filling apparatus 300b, and the void-filling apparatus 300c are on a transport mechanism with an open top, or at least substantially open top (such as the transport mechanism 350 shown in FIG. 10), the void-filling apparatus 300a, the void-filling apparatus 300b, and the void-filling apparatus 300c undergo little, if any, negative impact from environmental elements such as rain, even when the material makeup of the void-filling apparatus 300a, the void-filling apparatus 300b, and the void-filling apparatus 300c is substantially paper-based. Accordingly, the void-filling apparatus 300a, the void-filling apparatus 300b, and the void-filling apparatus 300c (and other void-filling apparatuses described herein) may include lightweight and water-resistant properties.

Figure 11:
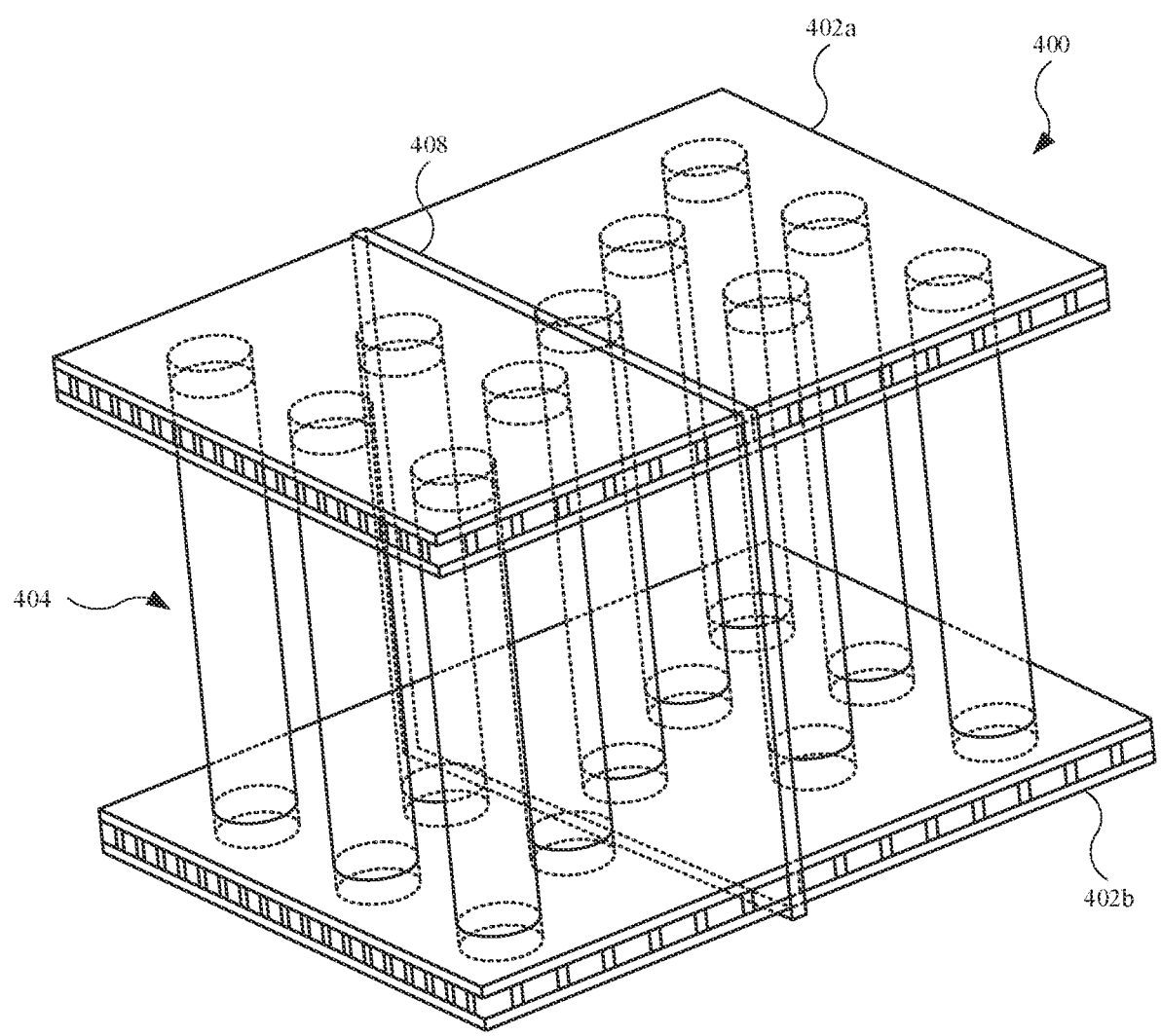
FIG. 11 illustrates an isometric view of an embodiment of an alternate embodiment of a void-filling apparatus.

While prior embodiments of a void-filling apparatus may include five cylindrical elements, other embodiments may include a different number of cylindrical elements. For example, FIG. 11 illustrates an isometric view of an embodiment of an alternate embodiment of a void-filling apparatus 400. The void-filling apparatus 400 shown and described in FIG. 11 may include any features and materials described herein for a void-filling apparatus. As shown, the void-filling apparatus 400 includes an end piece 402a and an end piece 402b. The void-filling apparatus 400 further includes cylindrical elements 404 connected to the end piece 402a and the end piece 402b. Also, in order to maintain the end piece 402a and the end piece 402b with the cylindrical elements 404, the void-filling apparatus 400 may also include a strap 408. The strap 408 may include a polymer material or band, or some other suitable material.

The number of cylindrical elements 404 for the void-filling apparatus 400 includes eleven cylindrical elements. Accordingly, the number of cylindrical elements may vary for a void-filling apparatus. Moreover, the number of cylindrical elements may vary based in part upon the amount of force required to withstand a load provided by the movement or shifting of the cargo. For example, when the weight and/or calculated acceleration or deceleration of the cargo is known, and the load force that a cylindrical element can take without being damaged or destroyed, the number of cylindrical element can be determined.

Figure 12:
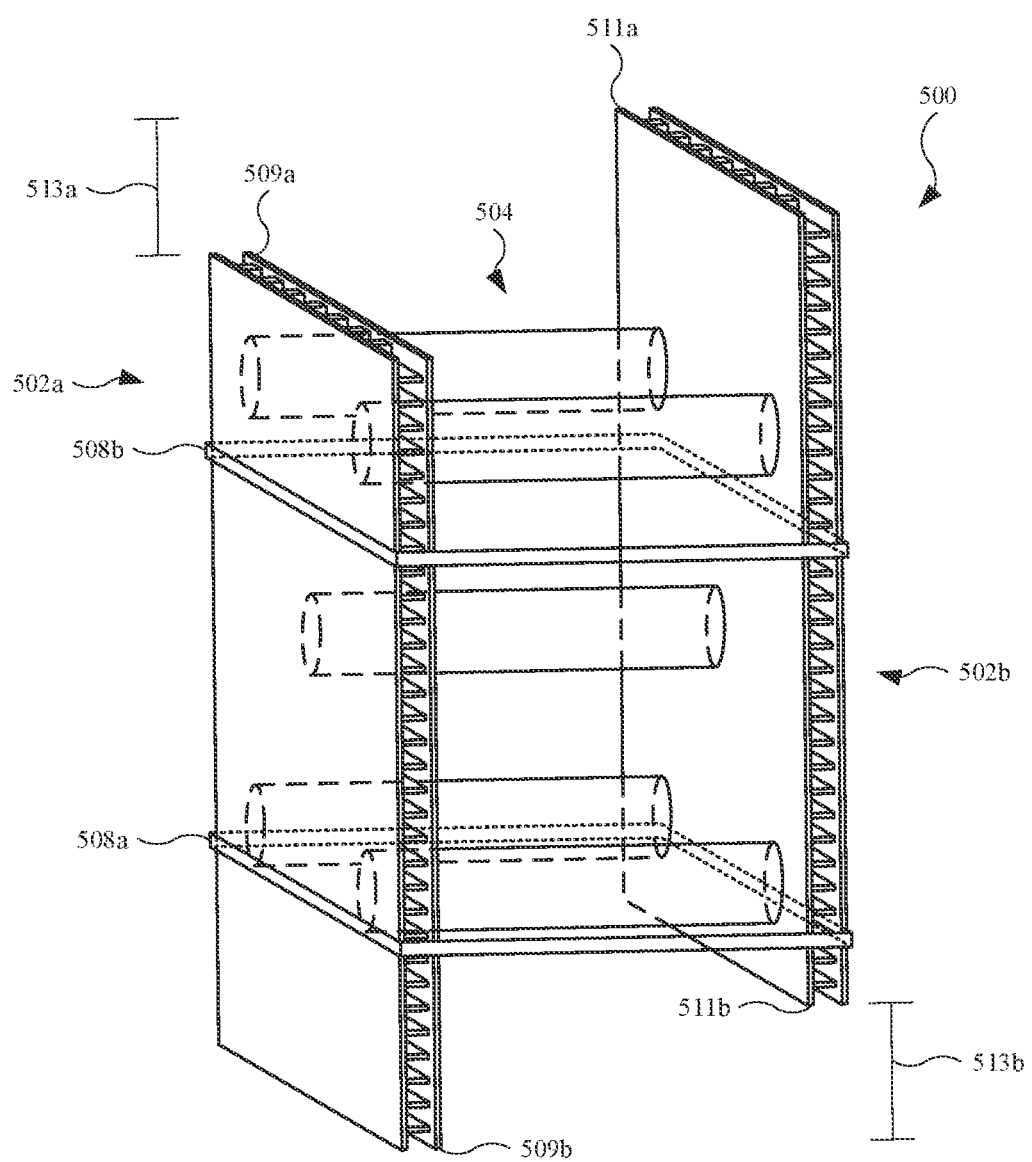
FIG. 12 illustrates an isometric view of an alternate embodiment of a void-filling apparatus, showing the void-filling apparatus with offset end pieces.

FIG. 12 illustrates an isometric view of an alternate embodiment of a void-filling apparatus 500, showing the void-filling apparatus with offset end pieces. The void-filling apparatus 500 may include any features shown and described herein for a void-filling apparatus. As shown, the void-filling apparatus 500 includes an end piece 502a and an end piece 502b. Additionally, the void-filling apparatus 500 includes cylindrical elements 504, or tubes, connected to the end piece 502a and the end piece 502b. The cylindrical elements 504 are designed to resist/offset/counter to forces provided to the void-filling apparatus 500 by, for example, cargo. Although a particular number of cylindrical elements are shown, the number of cylindrical elements may vary in other embodiments. Also, in order to maintain the end piece 502a and the end piece 502b with the cylindrical elements 504, the void-filling apparatus 500 may also include a strap 508a and a strap 508b.

Generally, in prior embodiments, the end pieces, including their respective edges, of a void-filling apparatus are aligned with each other. However, unlike prior embodiments, FIG. 12 shows the void-filling apparatus 500 in which the end piece 502a is offset, or not aligned, with respect to the end piece 502b, or vice versa. For example, an edge 509a of the end piece 502a is offset with respect to an edge 511a of the end piece 502b by a dimension 513a (defined along a single axis). The dimension 513a is based upon the size and shape of the end piece 502a and the end piece 502b. Similarly, an edge 509b of the end piece 502a is offset with respect to an edge 511b of the end piece 502b by a dimension 513b (defined along a single axis), which is also based upon the size and shape of the end piece 502a and the end piece 502b. The offset configuration between the end piece 502a and the end piece 502b allows the void-filling apparatus 500 to conform to one or more objects integrated with, for example, a transport mechanism. This will be shown below. As shown in FIG. 12, the end piece 502a and the end piece 502b are generally the same size and shape. As a result, the dimension 513a and the dimension 513b are the same, or at least substantially similar. However, in some embodiments, the end piece 502a has a different size and shape (i.e., is bigger or smaller) than the end piece 502b. In these embodiments, the dimension 513a and the dimension 513b are different from each other. Also, the offset configuration between the end piece 502a and the end piece 502b is based in part on the openings of the end piece 502a and the openings of end piece 502b, with the openings referring to locations in which the cylindrical elements 504 are received and secured.

Figure 13:
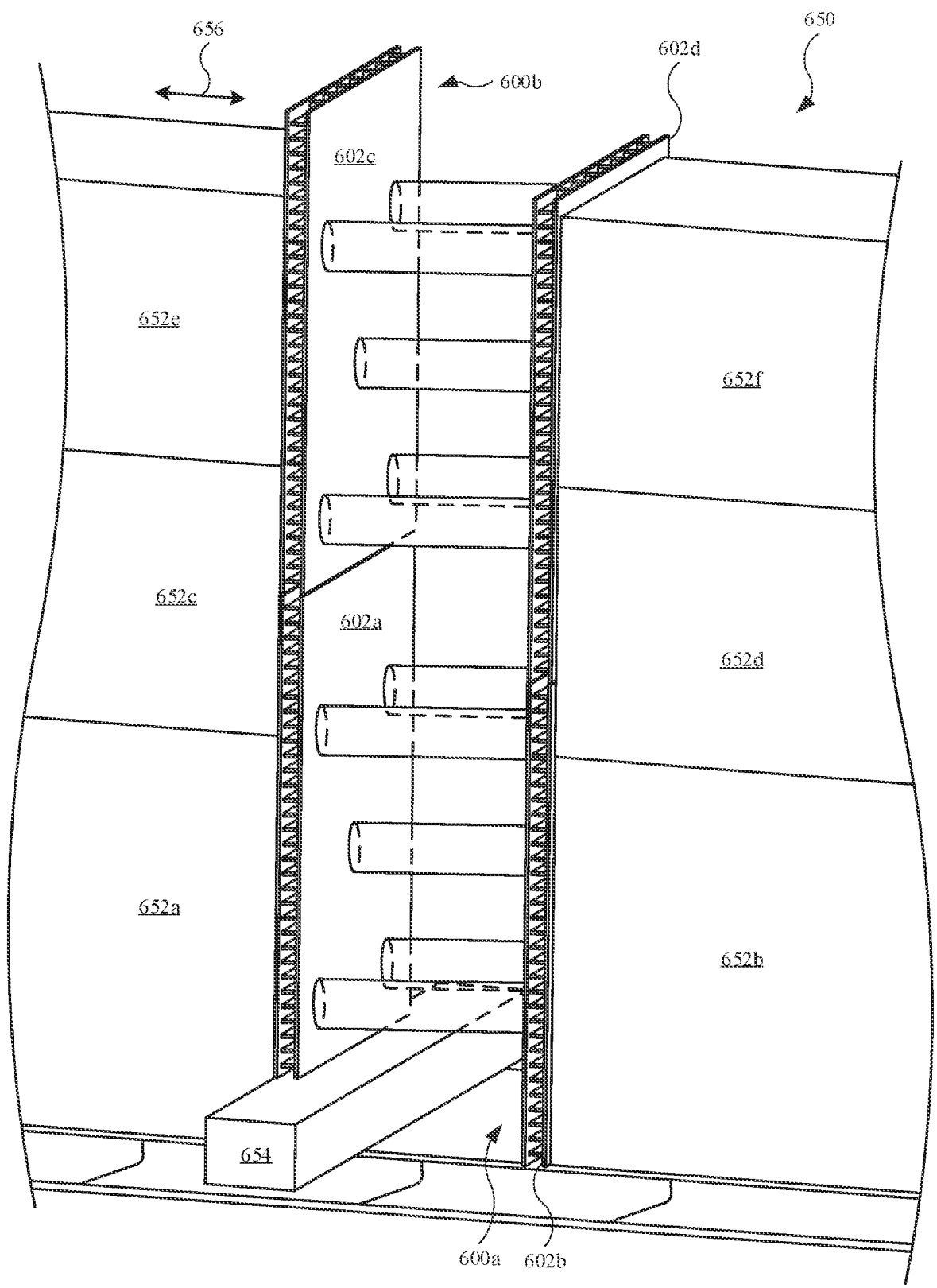
FIG. 13 illustrates an isometric view of several void-filling apparatuses with offset end pieces positioned between cargo, with the void-filling apparatuses and the cargo positioned on a transport mechanism, in accordance with some described embodiments.

FIG. 13 illustrates an isometric view of several void-filling apparatuses with offset end pieces positioned between cargo, with the void-filling apparatuses and the cargo positioned on a transport mechanism 650, in accordance with some described embodiments. As shown, a void-filling apparatus 600a is positioned between cargo 652a and cargo 652b, as well as between cargo 652c and 652d. Additionally, a void-filling apparatus 600b is positioned between cargo the 652c and the cargo 652d, as well as between cargo 652e and cargo 652f. Each of the aforementioned cargo may include lumber, as a non-limiting example. Also, the void-filling apparatus 600a and the void-filling apparatus 600b shown and described in FIG. 13 may include any features and materials described herein for a void-filling apparatus. Also, the transport mechanism 650 may include a train car. However, in some embodiments, the transport mechanism 650 includes a semi-truck, as a non-limiting example.

Based on the position of the void-filling apparatus 600a and the void-filling apparatus 600b, the respective cargo surrounding the void-filling apparatus 600a and the void-filling apparatus 600b is limited or prevented from movement, particularly during instances of acceleration and deceleration of the transport mechanism 650 that would otherwise cause the cargo to move or shift. Also, similar to prior embodiments, the void-filling apparatus 600a and the void-filling apparatus 600b may include parts and components, each of which are covered/coated by a water-resistant material. Accordingly, the void-filling apparatus 600a and the void-filling apparatus 600b (and other void-filling apparatuses described herein) may include lightweight and water-resistant properties.

As shown, each of the void-filling apparatus 600a and the void-filling apparatus 600b include offset end pieces similar to the end piece 502a and the end piece 502b of the void-filling apparatus 500 (shown in FIG. 12). For example, the void-filling apparatus 600a includes an end piece 602a that is offset with respect an end piece 602b, or vice versa. In this manner, when the transport mechanism 650 includes an object 654 (e.g., a rail, a support, or some other object) or some movable object, the void-filling apparatus 600a can accommodate, or make room for, the object 654. Accordingly, the void-filling apparatus 600a is aligned in a designed manner, i.e., the end piece 602a and the end piece 602b are perpendicular, or at least substantially perpendicular, with respect to a major direction of force (denoted by a two-sided arrow 656) provided by the cargo items when accelerating or decelerating. In other words, void-filling apparatus 600a is generally not diagonal or crooked, and provides minimal gaps between the cargo items. Also, due in part to a similar, corresponding offset configuration of the void-filling apparatus 600b, the void-filling apparatus 600b can engage the void-filling apparatus 600a, thereby reducing any gaps or space between the void-filling apparatus 600a and the void-filling apparatus 600b. As shown, the void-filling apparatus 600b includes an end piece 602c that is offset with respect to an end piece 602d. Further, the offset configuration between the end piece 602c and the end piece 602d is similar to that of the end piece 602a and the end piece 602b.

Figure 14:
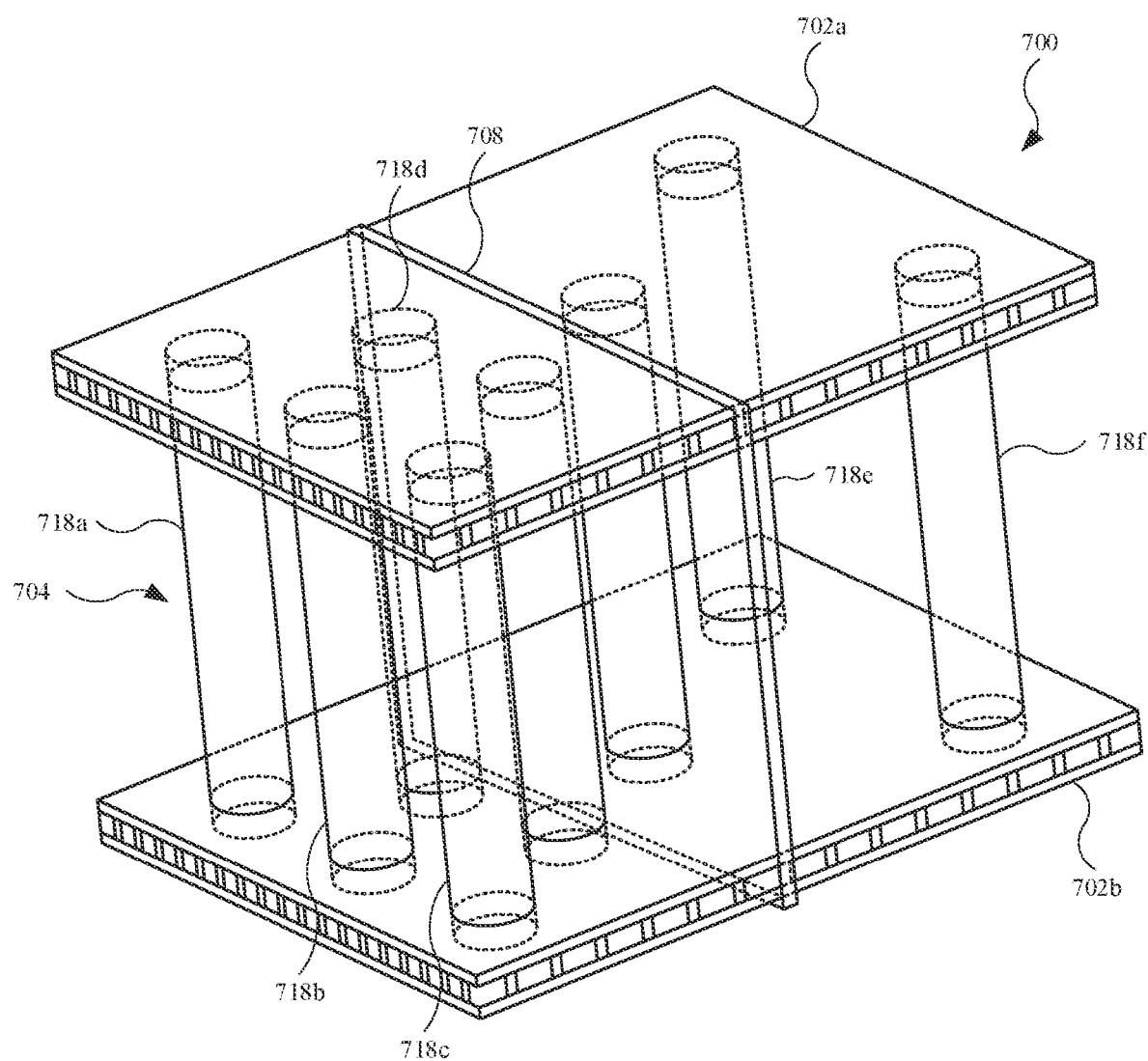
FIG. 14 illustrates an isometric view of an embodiment of an alternate embodiment of a void-filling apparatus.

FIG. 14 illustrates an isometric view of an embodiment of an alternate embodiment of a void-filling apparatus 700. The void-filling apparatus 700 shown and described in FIG. 14 may include any features and materials described herein for a void-filling apparatus. As shown, the void-filling apparatus 700 includes an end piece 702a and an end piece 702b. The void-filling apparatus 700 further includes cylindrical elements 704 connected to the end piece 702a and the end piece 702b. Also, in order to maintain the end piece 702a and the end piece 702b with the cylindrical elements 704, the void-filling apparatus 700 may also include a strap 708. The strap 708 may include a polymer material or band, or some other suitable material.

Referring again to the cylindrical elements 704, the void-filling apparatus 700 includes eight cylindrical elements. Furthermore, the spacing between adjacent cylindrical elements may be different. For example, the cylindrical elements 704 include a cylindrical element 718a, a cylindrical element 718b, a cylindrical element 718c, a cylindrical element 718d, a cylindrical element 718e, and a cylindrical element 718f; two additional cylindrical elements are also included. The cylindrical element 718a and the cylindrical element 718c may be equidistant with the cylindrical element 718b. However, the cylindrical element 718a may be closer to the cylindrical element 718d as compared to the cylindrical element 718c. Further, the distance separating the cylindrical element 718a from the cylindrical element 718b may be different from the distance separating the cylindrical element 718e from the cylindrical element 718f. For example, the distance separating the cylindrical element 718a from the cylindrical element 718b is less than the distance separating the cylindrical element 718e from the cylindrical element 718f. Accordingly, the distance separating the cylindrical element 718c from the cylindrical element 718b is less than the distance separating the cylindrical element 718e from the cylindrical element 718f.

As a result of the different distances between adjacent cylindrical elements, the number of cylindrical elements, and the corresponding amount of force resistance provided by the void-filling apparatus 700, for one section of the void-filling apparatus 700 may be different from another section of the void-filling apparatus 700. For example, suppose the strap 708 separates the void-filling apparatus 700 into two sections. The number of cylindrical elements (including the cylindrical element 718a, the cylindrical element 718b, the cylindrical element 718c, and the cylindrical element 718d) in one section (a "first section") is greater than number of cylindrical elements (including the cylindrical element 718e and the cylindrical element 718f) in another section (a "second section"). Accordingly, the amount of force resistance provided by the void-filling apparatus 700 at the first section may be greater than that which is provided by the second section.

Figure 15:
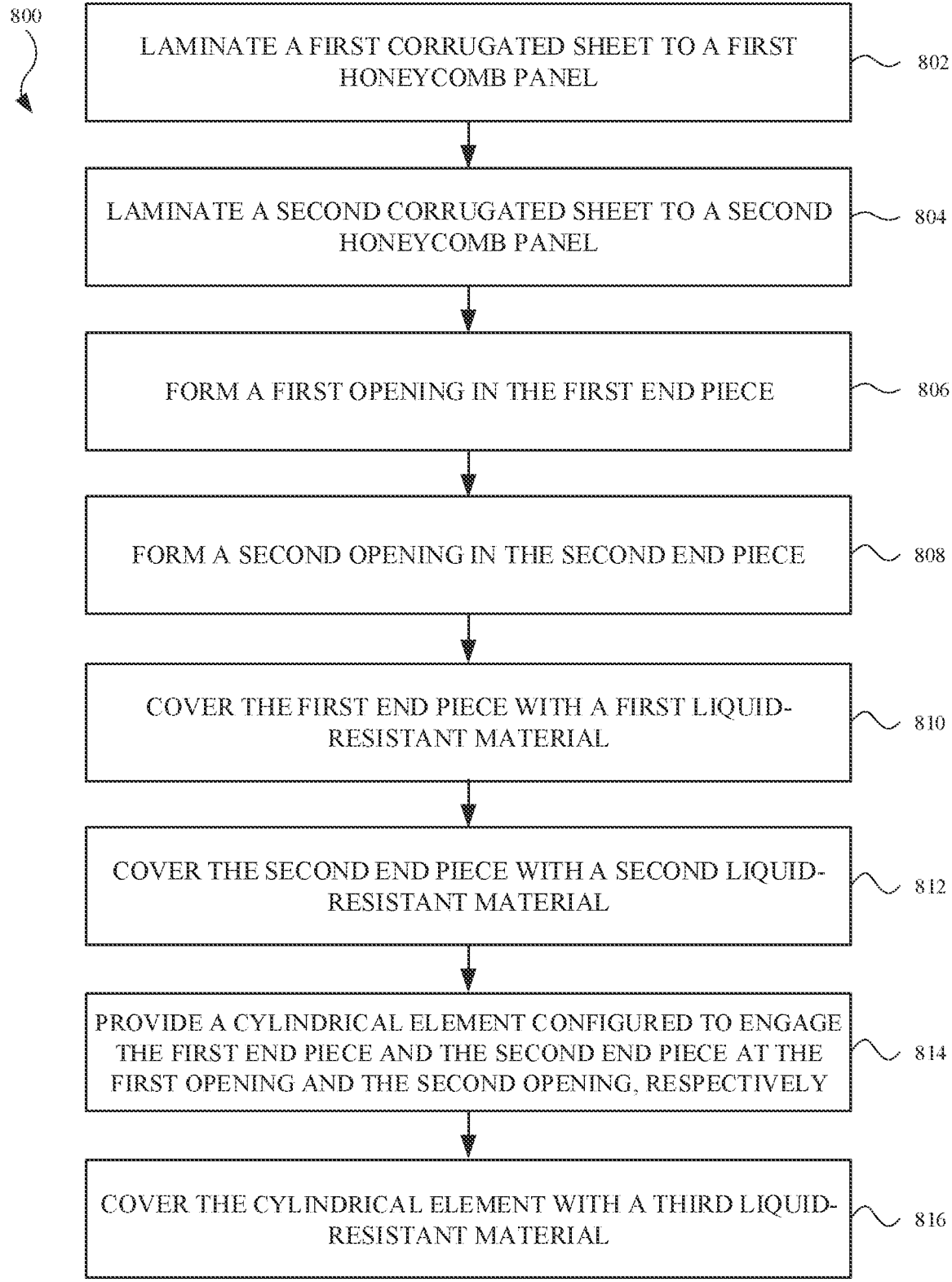
FIG. 15 illustrates a flowchart showing a method for method for forming a void-filling apparatus suitable for use with cargo, accordance with some described embodiments.

FIG. 15 illustrates a flowchart 800 showing a method for method for forming a void-filling apparatus suitable for use with cargo, accordance with some described embodiments. The flowchart 800 shows a series of steps, at least some of which may be carried out to form a void-filling apparatus shown and/or described herein.

In step 802, a first corrugated sheet is laminated to a first honeycomb panel. The first corrugated sheet and the first honeycomb panel may define a first end piece, or at least partially define the first end piece. In some instances, the lamination operation may include an adhesive, as a non-limiting example. Also, the corrugated sheet may be replaced by a material with an ECT rating.

In step 804, a second corrugated sheet is laminated to a second honeycomb panel. The second corrugated sheet and the second honeycomb panel may define a second end piece, or at least partially define the second end piece. In some instances, the lamination operation may include an adhesive, as a non-limiting example. Also, the corrugated sheet may be replaced by a material with an ECT rating.

In step 806, a first opening is formed in the first end piece. The opening may include die cutting the opening, as a non-limiting example.

In step 808, a second opening is formed in the second end piece. The opening may include die cutting the opening, as a non-limiting example. It should be noted that step 806 and step 808 may repeated to provide the number of desired openings, which may include five or more openings. In particular, step 806 and step 808 may repeated to match the number of cylindrical elements desired for the void-filling apparatus.

In step 810, the first end piece is covered with a first liquid-resistant material. The covering operation may include shrinking wrapping a material to the first end piece, as a non-limiting example. The material may include a liquid-resistant material.

In step 812, the second end piece is covered with a second liquid-resistant material. The covering operation may include shrinking wrapping a material to the first end piece, as a non-limiting example. The material may include a liquid-resistant material. Also, in some embodiments, the step 810 and the step 812 occur subsequently, or after, the step 806 and the step 806. In this manner, the first liquid-resistant material and the second liquid-resistant material extend into the first opening and the second opening, respectively.

In step 814, a cylindrical element configured to engage the first end piece and the second end piece at the first opening and the second opening, respectively, is provided. The cylindrical element may be inserted into the first opening and the second opening. Also, in some instances, the first opening and the second opening each include a diameter such that when the cylindrical element is inserted into the first opening and the second opening, a compression fit between the cylindrical element and the first end piece occurs at the first opening, and an additional compression fit between the cylindrical element and the second end piece occurs at the second opening. Additionally, in some instances, the cylindrical element may include end caps. In this manner, each end cap may provide additional surface area so that an adhesive can be applied to each end cap, and the cylindrical element can adhesively secure with the first end piece and the second end piece. It should be noted that step 814 may repeated to provide the number of desired cylindrical elements, which may include five or more cylindrical elements.

In step 816, the cylindrical element is covered with a third liquid-resistant material. The covering process may include wrapping the third liquid-resistant material around an outer perimeter of the cylindrical element. The third liquid-resistant material may include a polymer-based wrap, as a non-limiting example.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A void-filling apparatus suitable for use with transporting cargo, the void-filling apparatus comprising:
    a first end piece comprising a first opening, the first end piece covered by a first liquid-resistant material;
    a second end piece comprising a second opening, the second end piece covered by a second liquid-resistant material; and
    a cylindrical element positioned in the first opening and the second opening, the cylindrical element covered by a third liquid-resistant material.

2. The void-filling apparatus of claim 1, wherein the first end piece is offset with respect to the second end piece.

3. The void-filling apparatus of claim 1, wherein the first liquid-resistant material and the second liquid-resistant material comprises a shrink wrap material.

4. The void-filling apparatus of claim 1, wherein the third liquid-resistant material comprises a polymer wrap.

5. The void-filling apparatus of claim 1, wherein the cylindrical element defines a first cylindrical element, and further comprising:
    a second cylindrical element positioned in a third opening of the first end piece and a fourth opening of the second end piece;
    a third cylindrical element positioned in a fifth opening of the first end piece and a sixth opening of the second end piece, wherein the second cylindrical element and the third cylindrical element are equidistant from the first cylindrical element.

6. The void-filling apparatus of claim 1, wherein:
    the cylindrical element includes a first diameter,
    the first opening and the second opening each include a second diameter, and
    the cylindrical element is engaged with the first end piece and the second end piece by a first compression fit and a second compression fit, respectively, the first compression fit and the second compression fit based on the first diameter and the second diameter.

7. The void-filling apparatus of claim 6, further comprising:
    a first end cap covering a first end of the cylindrical element,
    a second end cap covering a second end of the cylindrical element, the second end opposite the first end,
    a first adhesive layer located on the first end cap, wherein the first adhesive layer adhesively secures the cylindrical element to the first end piece, and
    a second adhesive layer located on the first end cap, wherein the second adhesive layer adhesively secures the cylindrical element to the second end piece.

8. The void-filling apparatus of claim 1, further comprising a strap that surrounds the first end piece and the second end piece, the strap providing a force that maintains the first end piece and the second end piece engaged with the cylindrical element.

9. A void-filling apparatus suitable for use with transporting cargo, the void-filling apparatus comprising:
    a first end piece covered by a first liquid-resistant material;
    a second end piece covered by a second liquid-resistant material;
    a first cylindrical element coupled to the first end piece and the second end piece;
    a second cylindrical element coupled to the first end piece and the second end piece; and
    a third cylindrical element coupled to the first end piece and the second end piece, wherein:
        the first cylindrical element, the second cylindrical element, and the third cylindrical element are each covered by a third liquid-resistant material, and
        the second cylindrical element and the third cylindrical element are equidistant from the first cylindrical element.

10. The void-filling apparatus of claim 9, further comprising a fourth cylindrical element coupled to the first end piece and the second end piece, wherein the second cylindrical element, the third cylindrical element, and the fourth cylindrical element are equidistant from the first cylindrical element.

11. The void-filling apparatus of claim 10, further comprising a fifth cylindrical element coupled to the first end piece and the second end piece, wherein the second cylindrical element, the third cylindrical element, the fourth cylindrical element, and the fifth cylindrical element are equidistant from the first cylindrical element.

12. The void-filling apparatus of claim 9, further comprising:
a first opening formed in the first end piece; and
a second opening formed in the second end piece, wherein the first cylindrical element is positioned in the first opening and the second opening.

13. The void-filling apparatus of claim 12, further comprising:
a first end cap covering a first end of the first cylindrical element,
a second end cap covering a second end of the first cylindrical element, the second end opposite the first end,
a first adhesive layer located on the first end cap, wherein the first adhesive layer adhesively secures the cylindrical element to the first end piece, and
a second adhesive layer located on the first end cap, wherein the second adhesive layer adhesively secures the cylindrical element to the second end piece.

14. The void-filling apparatus of claim 9, wherein the first cylindrical element engages the first end piece by a first compression fit at the first opening, and wherein the second cylindrical element engages the second end piece by a second compression fit at the second opening.

15. The void-filling apparatus of claim 9, wherein the first end piece is offset with respect to the second end piece.

16. A method for forming a void-filling apparatus suitable for use with cargo, the method comprising:

laminating a first corrugated sheet to a first honeycomb panel, the first corrugated sheet and the first honeycomb panel defining a first end piece;
laminating a second corrugated sheet to a second honeycomb panel, the second corrugated sheet and the second honeycomb panel defining a second end piece;
forming a first opening in the first end piece;
forming a second opening in the second end piece;
covering the first end piece with a first liquid-resistant material;
covering the second end piece with a second liquid-resistant material;
providing a cylindrical element configured to engage the first end piece and the second end piece at the first opening and the second opening, respectively; and
covering the cylindrical element with a third liquid-resistant material.

17. The method of claim 16, wherein forming the first opening comprises die cutting the first end piece, and wherein forming the second opening comprises die cutting the second end piece.

18. The method of claim 17, wherein covering the first end piece with a first liquid-resistant material comprises shrink wrapping the first end piece, and wherein covering the first end piece with a second liquid-resistant material comprising shrink wrapping the second end piece.

19. The method of claim 16, further comprising offsetting the first end piece with respect to the second end piece.

20. The method of claim 16, furthering comprising:
covering a first end of the cylindrical element with a first end cap; and
covering a second end of the cylindrical element with a second end cap, wherein the first end cap and the second end cap are each configured to receive an adhesive used to secure the first end and the second end at the first opening and the second opening, respectively.

* * * * *